April 6, 1954

M. C. KINCAIDE
MANURE SPREADER

2,674,460

Filed April 19, 1950

INVENTOR.
Merrill C. Kincaide
BY
ATTORNEY

Patented Apr. 6, 1954

2,674,460

UNITED STATES PATENT OFFICE 2,674,460

MANURE SPREADER

Merrill C. Kincaide, Detroit, Mich., assignor, by mesne assignments, to Ford Motor Company, Dearborn, Mich., a corporation of Delaware Application April 19, 1950, Serial No. 156,858

6 Claims. (Cl. 275—6)

This invention relates to a manure spreader and more particularly to the driving mechanism utilized to transfer the power to the moving elements of the manure spreader and to the controls for operating the spreader.

Manure spreaders are provided with rotary beating elements and rotary spreading devices for breaking up and spreading the manure in finely divided particles over a wide area. The power for driving such rotary elements is generally obtained by suitable connection to either the power-take-off of the tractor or to the transporting wheels of the manure spreader.

When engaging the drive mechanism for powering the rotary elements of the manure spreader a shock of considerable magnitude must be absorbed by such mechanism and, in order to withstand such shock, the driving mechanism must be of good design and substantially built to avoid being a source of constant trouble and irritation. The incremental linear advancement of the conveyor utilized for moving the load against the rotary beaters should be adjustable so that the amount or rate of manure being distributed can be selectively controlled, and such adjustment should preferably be made conveniently from the tractor seat without the necessity of stopping the beating elements.

Accordingly, it is an object of this invention to provide an improved clutch arrangement for engaging or disengaging the power drive with the rotary beating elements of a manure spreader without the necessity of stopping the manure spreader for such engagement.

Another object of this invention is to provide an improved single control, conveniently operable from the tractor seat, for selectively engaging the drive mechanism of a manure spreader with the conveyor and/or rotary beating elements and for variably controlling the rate of incremental linear movement of the conveyor.

The specific nature of this invention, as well as other objects and advantages thereof, will become apparent to those skilled in the art from the following detailed description, taken in conjunction with the attached sheets of drawings on which, by way of preferred example only, is illustrated one embodiment of this invention.

On the drawings:

Figure 5 is an enlarged detail view of the conveyor controlling mechanism.

Figure 12 is a detail view showing the control cam on the left hand side of the manure spreader.

Figure 13 is a detail elevational view of the supporting stand.

As shown on the drawings:

Figures 1, 2, 3:
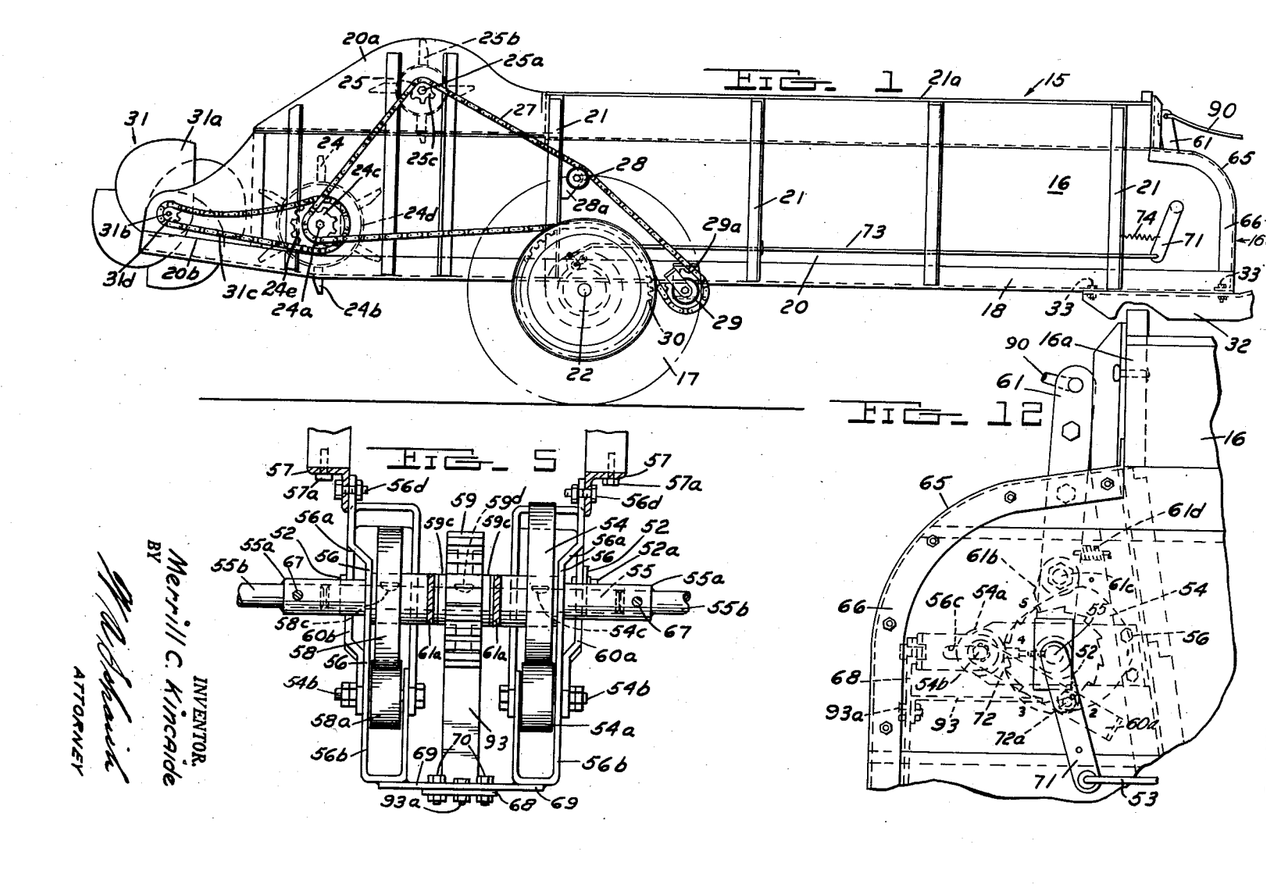
Figure 1 is a right side elevational view of the manure spreader embodying this invention.
Figure 2 is a left side elevational view of the manure spreader.
Figure 3 is an enlarged cross sectional view taken substantially along the plane 3—3 of Figure 2.
Figures 9, 10, 11:
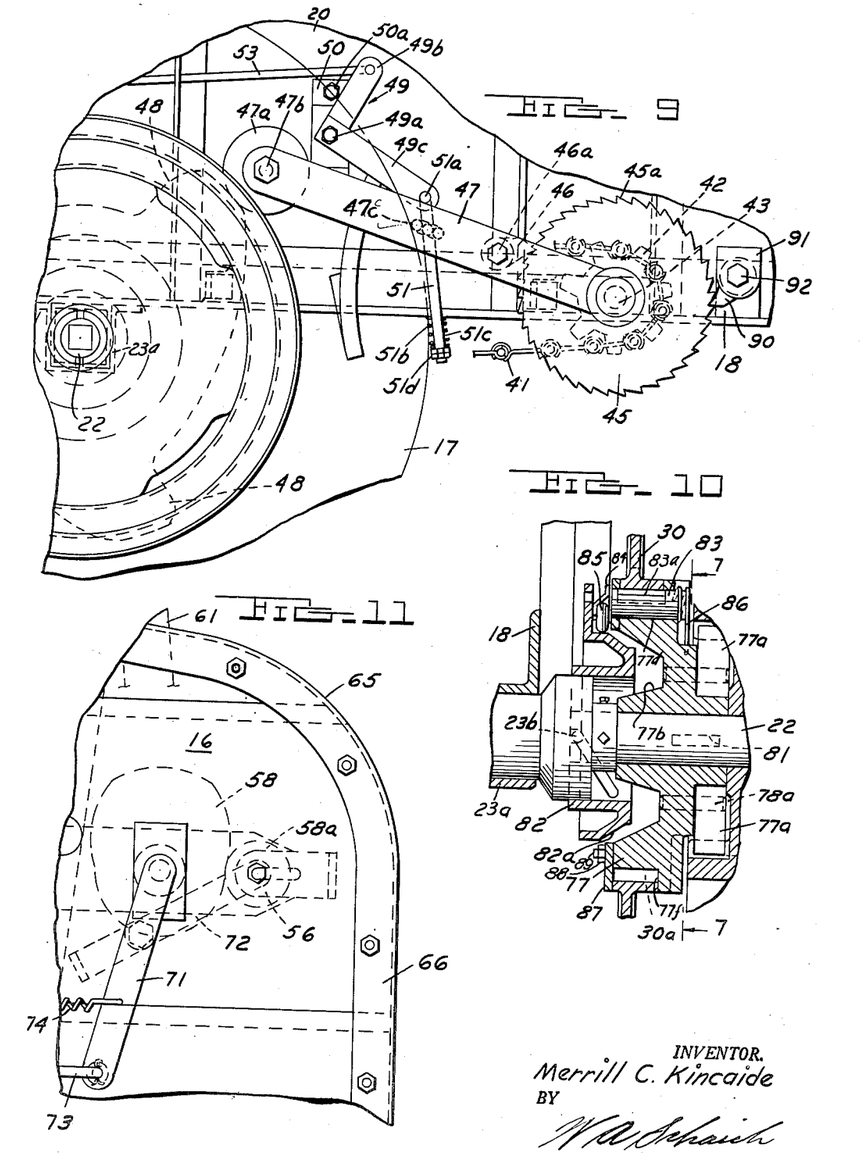
Figure 9 is an enlarged detail view of the conveyor feeding mechanism.
Figure 10 is a detail view showing the clutch engaged in driving position.
Figure 11 is an enlarged detail view showing the control cam on the right hand side of the manure spreader.

In Figure 1 there is shown in assembled relation a manure spreader 15 comprising a rectangular box 16 mounted on a pair of transversely spaced wheels 17 located rearwardly of the center of such box. Box 16 consists essentially of a pair of parallel longitudinally disposed angle iron side frame members 18 transversely spaced by a floor 19. Oppositely disposed sides 20 are respectively secured to the corresponding frame members 18 and such sides are stiffened by vertically disposed angle iron braces 21 and such braces are capped by a stiffening rail 21a. Wheels 17 are rotatably journaled on an axle 22 which is rotatably supported in a pair of transversely spaced bearings 23 each respectively secured to the underside of the respective longitudinal frame member 18 by a U-shaped strap 23a as shown in Figures 3 and 9.

A pair of beaters 24 and 25 are transversely mounted in vertically spaced relationship at the rear of manure spreader 15. Beater 24 is mounted on a shaft 24a rotatably journaled in suitable bearings affixed to the sides 20 of manure spreader 15. Beater 24 is of conventional construction comprising a plurality of spaced radially extending beater elements 24b secured by welding or riveting to a drum 24d surrounding and secured to shaft 24a. Such beater elements rotate in a circular path adjacent the rear end of floor 18 on which a conveyor 26 is provided to move the load contained in the manure spreader rearwardly against beater 24. Beater 25 is mounted on a shaft 25a journaled above and somewhat forwardly of beater 24 in upwardly projecting portions 20a of sides 20. A plurality of beater elements 25b similar to beater elements 24b of beater 24 are also provided on beater 25. A sprocket 25c (Figure 1) is provided on the right hand end of shaft 25a and a sprocket 24c is provided on the right hand end of shaft 24a, whereby beaters 24 and 25 are concurrently rotatably driven by a chain 27 as best shown in Figure 1. Chain 27 is directed around an idler sprocket 29 rotatably mounted on an adjustable bracket 29a welded to longitudinal frame member 18 ahead of axle 22. Sprocket 29 directs chain 27 over a driving sprocket 30 associated with a wheel driven driving member 77 shown in Figure 3 as will be explained. A second idler sprocket 28 mounted on a bracket 28a secured to vertical brace 21 substantially above axle 22 is provided to assist in guiding of chain 27.

Sides 20 of manure spreader 15 extend rearwardly as shown at 20b and a wide spread device 31 is transversely mounted between such side extensions. Widespread device 31 comprises a plurality of fan-like blades 31a secured as by welding to a transverse shaft 31b. Blades 31a are disposed in spaced relationship along shaft 31b and such shaft is rotatably journaled in the side extensions 20b and are so positioned that the rotary path of blades 31a is adjacent the rotary path of beater 24. Widespread 31 is driven by a chain 31c (Fig. 1) surrounding a sprocket 24e mounted adjacent sprocket 24c and a sprocket 31d mounted on the end of widespread shaft 31b. It should be mentioned here that the beating elements 24 and 25 and the widespread device 31 may be of any well-known construction, as the construction of such beater and widespread devices is conventional and forms no part of this invention.

A pair of transversely spaced angle iron support members 32 are secured to the underside of frame members 18 by a pair of bolts 33 as shown in Figure 1. Support members 32 converge forwardly and are joined together by a vertical plate member 34 secured to the forward ends of support members 32 by welding. The converging support members 32 thus define a tongue 35 (Figure 13) for connection to the drawbar of the tractor (not shown). A pair of vertically spaced, forwardly projecting lips 34a are integrally formed on plate member 34 and such lips are maintained in spaced relationship by a spacer member 34b welded to respective lips 34a. The forward ends of lips 34a diverge slightly to facilitate mounting such lips on the drawbar of the tractor. A pair of vertically aligned holes 34c respectively provided in lips 34a permit the insertion of a linch pin (not shown) whereby such tongue is pivotally secured to the tractor drawbar.

A stand 36 is pivoted to the front end of tongue 35 by a transverse bolt 37. Stand 36 is provided with an adjustable foot member 36a which is telescoped inside of stand 36 and may be secured in a plurality of selected positions by a bolt 36b. Stand 36 is releasably secured in either a vertical position as shown in Figure 13 or in a horizontal transporting position by means of a latch 38. Latch 38 is pivoted to stand 36 by a transverse bolt 38a. A pair of notches 38b and 38c are provided in spaced relationship on latch 38 which are cooperable with a transverse angular bar 39 welded to respective support members 32 whereby stand 36 may be locked in either a supporting position or retracted position. A spring 40 secured at one end within an aperture 38d provided in a forwardly projecting end portion of latch 38 surrounds bolt 37 at its other end to bias latch 38 against bar 39 whereby either of the notches 38b or 38c is maintained in engagement with bar 39.

Conveyor 26, Figure 3, comprises a plurality of angle iron raddle bars 26a secured in longitudinally spaced relationship between a pair of transversely spaced parallel conveyor chains 41. A tab 41a integrally formed on each chain 41 projects inwardly and such tab is secured to a reduced section end 26b of raddle bars 26a by a vertically disposed rivet 26c. The rear ends of conveyor chains 41 engage sprockets 42 respectively mounted on each end of a conveyor shaft 43 rotatably journaled in the rear end of each frame member 18 and transversely thereof, as shown in Figure 9. The forward ends of chains 41 engage sprockets 44a secured to each end of a transverse shaft 44 rotatably supported by frame members 18 at the forward end of manure spreader 15 as shown in Figure 2.

On the left hand end of shaft 43 as best shown in Figure 9, there is also mounted a ratchet 45 adjacent sprocket 42. Ratchet 45 is provided to incrementally rotate shaft 43 whereby chains 41 are incrementally moved to advance raddle bars 26a along the bed or floor 19 of manure spreader 15. Ratchet 45 is incrementally rotated by a pawl 46 pivotally mounted by a bolt 46a on a cam follower arm 47. Follower arm 47 is pivotally mounted on the shaft 43 adjacent the outside face of ratchet 45. A roller 47a is rotatably secured to the other end of follower arm 47 by a bolt 47b. Roller 47a contacts a three lobe cam 48 secured to axle 22 adjacent left hand wheel 17 as shown in Figures 2, 3 and 9. A holding pawl 90 is rotatably mounted on a bolt 92 transversely secured to a bracket 91 welded to frame member 18. Pawl 90 rotates in only one direction from its illustrated position in order to yieldingly secure ratchet 45 against reverse rotation.

For actuation of arm 47 to force roller 47a into contact with cam 48, a bell crank 49 is pivotally mounted by a bolt 49a to a bracket 50 (Figure 9) secured to the side 20 of manure spreader 15 by a pair of bolts 50a. Bell crank 49 comprises two angularly spaced arms 49b and 49c, arm 49c sloping downwardly and rearwardly to a point intermediate the ends of follower arm 47.

A depending rod 51 is pivotally connected to the lower arm 49c of bell crank 49. Such rod is provided with a bent end 51a which projects through a suitable transverse aperture provided in the lower end of arm 49c. Rod 51 passes through an eye bolt 47c which is pivotally secured to a medial portion of arm 47. A spring 51b surrounds the lower end of rod 51 and is retained on rod 51 by a pair of nuts 51d screwed on to the lower end of such rod. Spring 51b thus acts as a cushion stop for counterclockwise movement of the arm 47. A control rod 53 is pivotally connected at its one end to the upper end of arm 49b of bell crank 49 and at its other end to cam 54, to be later described, whereby such bell crank may be incrementally rotated to selectively vary the extent of engagement of roller 47a with cam 48. The highest position assumed by follower arm 47 in a clockwise direction is, of course, determined by the maximum radius of the lobes of cam 48. The maximum displacement of follower arm 47 in a counterclockwise direction is determined by the vertical position of the top end of spring 51b which, as pointed out above, is controlled by the angular position of bell crank 49. Hence, the total throw of follower arm 47 produced by the lobes of cam 48 is a direct function of the angular position of bell crank 49. Such variation of the throw of follower arm 47 directly varies the amount of incremental movement imparted by the pawl 46, carried by follower arm 47, to the ratchet 45. Since the ratchet 45 drives the conveyor chains 41, it is apparent that the rate of incremental movement of the chains 41 may be varied by variation of the angular position of bell crank 49.

The angular position of bell crank 49 is governed by a plate-like cam 54 (Figures 2, 4 and 5) through the connection of such cam to bell crank 49 by rod 53. A second plate-like cam 58 is also provided for effecting the engagement of beaters 24 and 25 and widespread 31 with a power source through a clutch as will be later explained. On the forward end 16a of the box 16 there is provided a pair of transversely spaced, vertically disposed angle irons 57 secured to the forwardly facing end 16a by a plurality of bolts 57a. A pair of brackets 56 (Figure 5) are, respectively, horizontally secured to angle irons 57 by a bolt 56d. Each bracket 56 is provided with an offset portion 56a which brings the forwardly disposed ends of such brackets closer together. The forward end of each bracket 56 is bent into a U-shape configuration as shown at 56b. An arm 69 is, respectively, horizontally welded to each of the U-shaped end portions 56b of brackets 56 and such arms are disposed inwardly for connection to a vertical member 68 secured to the bottom of manure spreader box 16. Each arm 69 is respectively secured to vertical member 68 by a bolt 70. Brackets 56 are provided to rotatably support a transverse shaft 55, a suitable transverse hole (not shown) being provided in each bracket 56 to so rotatably support shaft 55 transversely of such brackets. Cams 54 and 58 are mounted on transverse shaft 55 and are separated in transversely spaced relationship by a ratchet 59 mounted on the shaft between such cams. Cam 54, 58 and ratchet 59 are respectively non-rotatably secured to shaft 55 by keys 54c, 58c and 59d. Ratchet 59 is provided with integral axial hub portions 59c on opposite sides thereof which abut the contiguous surfaces of the respective cam members 54 and 58.

In the arms of U-shaped end 56b of each bracket 56 there is provided a longitudinally disposed slot 56c to support a transverse bolt 54b. Rollers 54a and 58a are rotatably mounted on each bolt 54b and each of such rollers contacts the corresponding cam 54 or 58. A downwardly and rearwardly sloping, substantially U-shaped arm 60a is pivotally mounted on bolt 54b supported within slot 56c on right hand bracket 56 as shown in Figures 5 and 12. Arm 60a partially surrounds cam 54 and is of open construction to permit such cam to rotate between the adjacent sides of such arm. An arm 60b similarly constructed is pivotally mounted on the left hand bracket 56 on the corresponding bolt 54b.

Figures 4, 6:
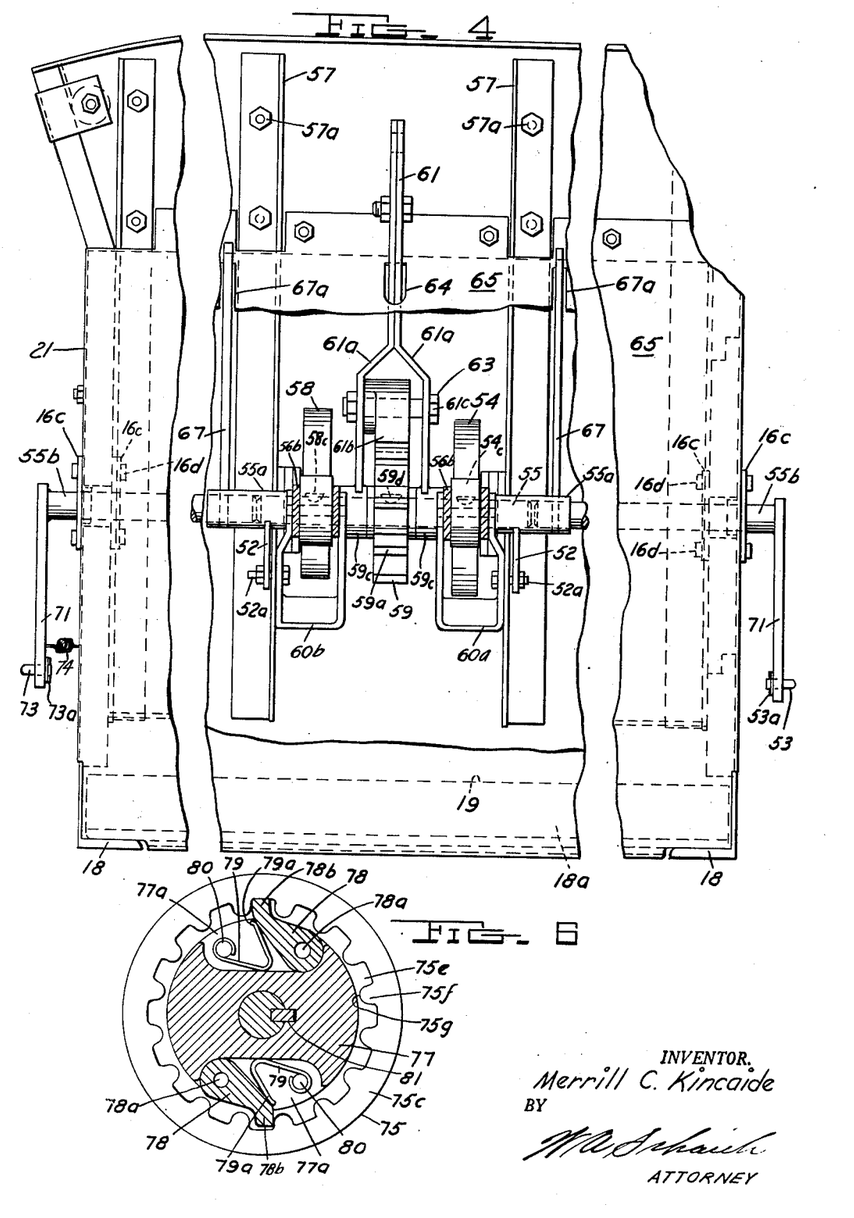
Figure 4 is a front end view of the manure spreader.
Figure 6 is a sectional view taken along the plane 6—6 of Figure 3.

A tubular sleeve 55a surrounds each end of shaft 55 projecting beyond the spaced apart brackets 56 (Figures 4 and 5). A depending arm 52 is welded to each sleeve 55a and such depending arms are adjacent the respective arms 60a and 60b. Depending arms 52 are respectively secured to arms 60a and 60b by a transverse bolt 52a. Thus when cam rollers 54a and 58a are moved horizontally in a path determined by the shape of cams 54 and 58, arms 60a and 60b will therefore rotate sleeves 55a through the connection of arms 52 with respective arms 60a and 60b.

One end of a shaft 55b is inserted in the open end of each sleeve 55a and the other end of such shaft is rotatably supported in a pair of apertured bearing plates 16c secured to the forwardly projecting sides of box 16 by bolts 16d and transversely spaced by the side wall of box 16. Bell cranks 71 are respectively welded to the ends of shafts 55b projecting beyond the wall 16c. Each shaft 55b is non-rotatably secured to each sleeve 55a by a vertically disposed pin 67 inserted in suitable radial matching holes respectively provided in sleeve 55a and shaft 55b. Pins 67 are provided to permit timing of the respective cams 54 and 58 in order to obtain the correct sequence of movement of the beaters and the conveyor as will be later explained.

Rod 53 is connected to the right hand bell crank 71 as shown in Figures 2 and 4 and such rod is pivotally secured to such crank by a pin 53a. The bias of spring 51b provided on the end of rod 51 maintains a downward pressure on bell crank 49 thereby tensioning rod 53 which in turn maintains roller 54a in contact with cam 54 through the connection of depending arm 52 with arm 60a. Roller 58a is maintained in contact with cam 58 by the bias of a spring 74 connected to an adjacent vertical brace member 21 and to left hand crank 71 as shown in Figures 1 and 4 in the same manner as roller 54a is maintained in contact with cam 54.

Shaft 55 is rotated by a manually operated lever 61. Lever 61 is provided with a forked end having transversely spaced tines 61a, the ends of which are welded to the hub portions 59c of ratchet 59. Lever 61 carries a ratchet engaging pawl 61b rotatably secured to lever 61 as by bolt 61c. Pawl 61b is so mounted on lever 61 that such pawl can rotate in one direction to permit slippage over the teeth 59a of ratchet 59 and to rigidly engage teeth 59a in the opposite direction of rotation. A spring-like detent 93, secured to vertical member 68 by a bolt 93a, co-operates with ratchet 59 to yieldingly secure such ratchet in a desired position of rotation. A spring 61d connected to lever 61 and the front face 16a of box 16 normally holds lever 61 in the upright position shown in Figure 12. Pins 67 project upwardly through longitudinal slots 67a provided in cover 65. A suitable slot 64 in cover 65 accommodates the upwardly projecting end of lever 61 whereby such lever may be rotated to rotate shaft 55 in a manner to be later explained.

Each of the supporting wheels 17 (Figure 3) is provided with a hub portion 75 having an axial hole 76 for respectively mounting such hub on an end of axle 22. Wheel 17 is provided with the usual central disc portion 17a having a peripheral rim 17b on which a rubber tire 17c is mounted. Disc portion 17a of wheel 17 is secured to a radial flange 75a of hub 75 by a plurality of bolts 75b. An integral, inwardly facing dish shaped flange 75c is provided on the inwardly facing end of each hub 75 and a plurality of radially disposed notches 75e (Figure 6) are provided on the inner periphery of flange 75c in angularly spaced relationship. Such notches define radial tooth-like projections 75f which are provided with a rounded end surface 15g.

A substantially cylindrical driving member 77 is mounted on shaft 22 adjacent the inside face of hub 75. A pair of opposed recesses 77a are provided on the face of driving member 77 (Figures 3 and 6) and in each of such recesses there is pivotally mounted a dog 78 on a horizontal pin 78a. Dog 78 is provided with a curved end 78b which is engageable with one of the recesses 75e in flange 75c whereby driving connection is made between hub 75 and driving member 77. A spring 79 looped about a horizontal pin 80 secured within a suitable aperture in each recess 77a has an end portion 79a bearing against dog 78 to exert a bias against such dog so that the end surface thereof will normally be in contact with the bottom of notches 75e.

Driving member 77 (Figures 3 and 10) is non-rotatably secured to shaft 22 by a key 81. On the inside face of driving member 77 there is provided a substantially conically shaped concentric circular groove 77b and such groove receives a clutch member 82 provided with a substantially conically shaped face portion 82a as will be presently explained. A plurality of substantially U-shaped notches 77c (Figure 7) are provided on the inside face of driving member 77 and such notches are preferably equidistantly spaced. Near the top of driving member 77 there is provided a transverse hole 77d in which there is inserted a locking pin 83. Locking pin 83 is provided with a flat milled surface 83a on the upper side thereof for a purpose to be later described. A fork 84 of built-up construction is welded to the inside or left hand end of locking pin 83 (Figures 3 and 10) and such fork projects downwardly to rotatably support a roller 85 mounted on a transverse pin 85a which is supported by the lower end of fork 84. Roller 85 cooperates with a cam surface on clutch 82 to rotate pin 83 as will be later described. A torsion spring 86 is fastened about the other end of locking pin 83 and to driving member 77 to insure the return of pin 83 as will also be later explained.

A portion of the periphery of driving member 77 (Figure 3) is of reduced diameter as shown at 77e thereby defining a shoulder 77f. Driving sprocket 30 is mounted on the reduced diameter portion 77e of driving member 77 and the outside face of such sprocket abuts shoulder 77f. Sprocket 30 is rotatably retained on driving member 77 by a plurality of fingers 87 each, respectively, radially secured to driving member 77 by a nut 88 threaded on to a stud 89. A plurality of semi-cylindrical transverse grooves 30a (Figure 7) are provided on the inner periphery of sprocket 30 adjacent the reduced diameter portion 77e of driving member 77. Grooves 30a are provided to admit the rounded portion of pin 83 whereby sprocket 30 is locked to driving member 77 at the desired moment as will be later described.

Clutch 82 is provided with a cylindrical hollow hub portion 82b which permits mounting of such clutch on the right hand cylindrical end of right hand bearing 23 as shown in Figure 3. A pair of diametrically opposed pins 23b are provided in bearing 23 which project above the surface of such bearing and cooperate with a helical cam slot 82c provided on opposite ends of clutch member 82. The conically shaped face 82a of clutch 82 terminates in a cylindrical end portion 82d on which roller 85 normally rides. An upstanding integral lug 82e is provided on top of clutch 82 as shown in Figure 3 and the other end of control rod 73 is pivotally connected within an aperture 82f provided in the upper end of such lug whereby clutch 82 is rotated to effect engagement of sprocket 30 with driving member 77.

*Operation*

When it is desired to engage cam follower roller 47a on follower arm 47, with cam 48 to set the conveyor 26 in motion and to engage clutch 82 with driving member 77, pawl carrier lever 61 is successively pulled forwardly as by rope 90 secured to the upper end of such lever to engage pawl 61b with ratchet 59. Such movements of lever 61 rotate ratchet wheel 59 and in turn cams 54 and 58, such cams being in contact with respective rollers 54a and 58a will then cause such rollers to move horizontally in arms 56b thereby effecting movement of arms 52, thence levers 71 which then move control rods 53 and 73 respectively connected to the ends of corresponding levers 71 and to crank 49 and lug 82e. It should be mentioned here that cam 54 is provided with five different lobes which provide for several speeds of conveyor 26 and to permit such conveyor to run when beaters 24 and 25 and widespread 31 are not rotated. Accordingly, when lever 61 is rotated to move cam 54 from the non-operative position to the first position as indicated on Figure 12, conveyor 26 then operates in its lowest incremental rate of advancement. As wheels 17 rotate, the three lobe cam 48 contacts roller 47a and pawl 46 of follower arm 47 rotates ratchet wheel 45 through a circular arc, the amount of which is governed by the number of teeth that pawl 46 engages. Ratchet 45 being secured to shaft 43 thence rotates such shaft through sprockets 42 secured thereon and thence chain 41, to which raddle bars 26a are secured. Thus the load contained in box 16 is moved rearwardly against beaters 24 and 25.

Figures 1, 2, 7, 8:
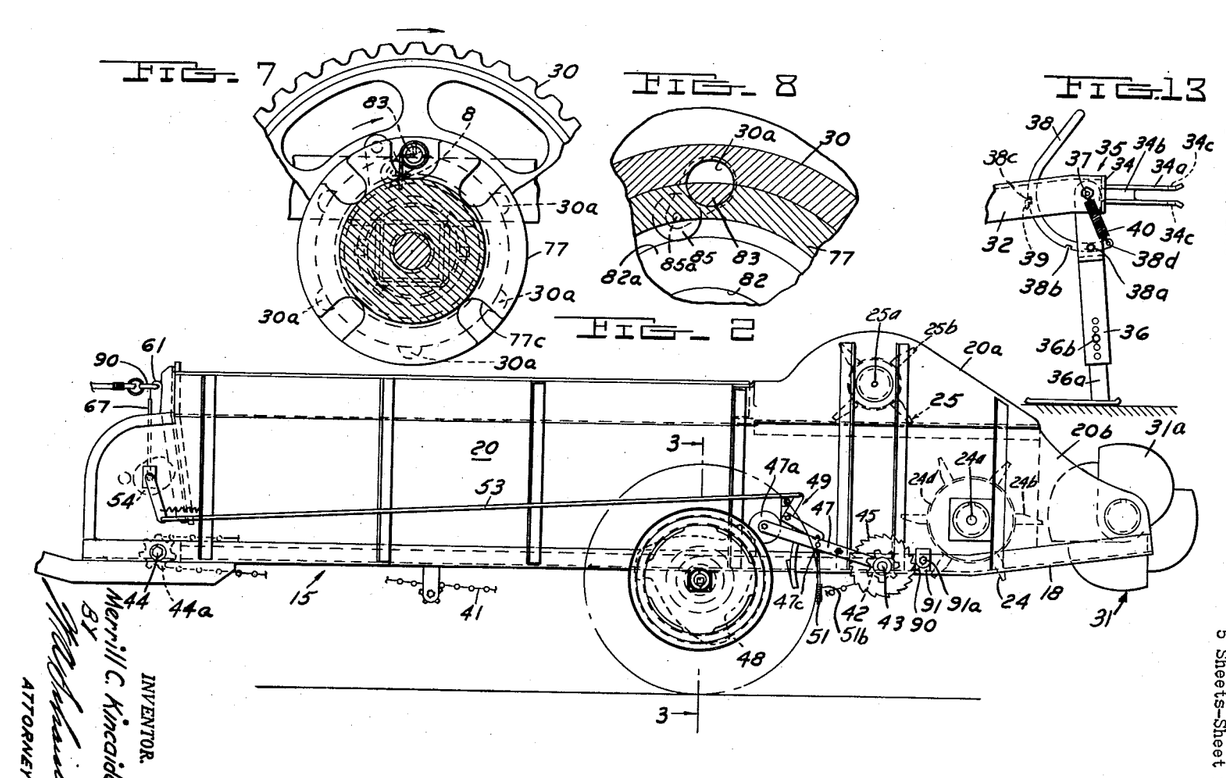
Figure 7 is a cross sectional view taken along the plane 7—7 of Figure 3.
Figure 8 is a cross sectional view taken along the plane 8—8 of Figure 3.
Figure 3:
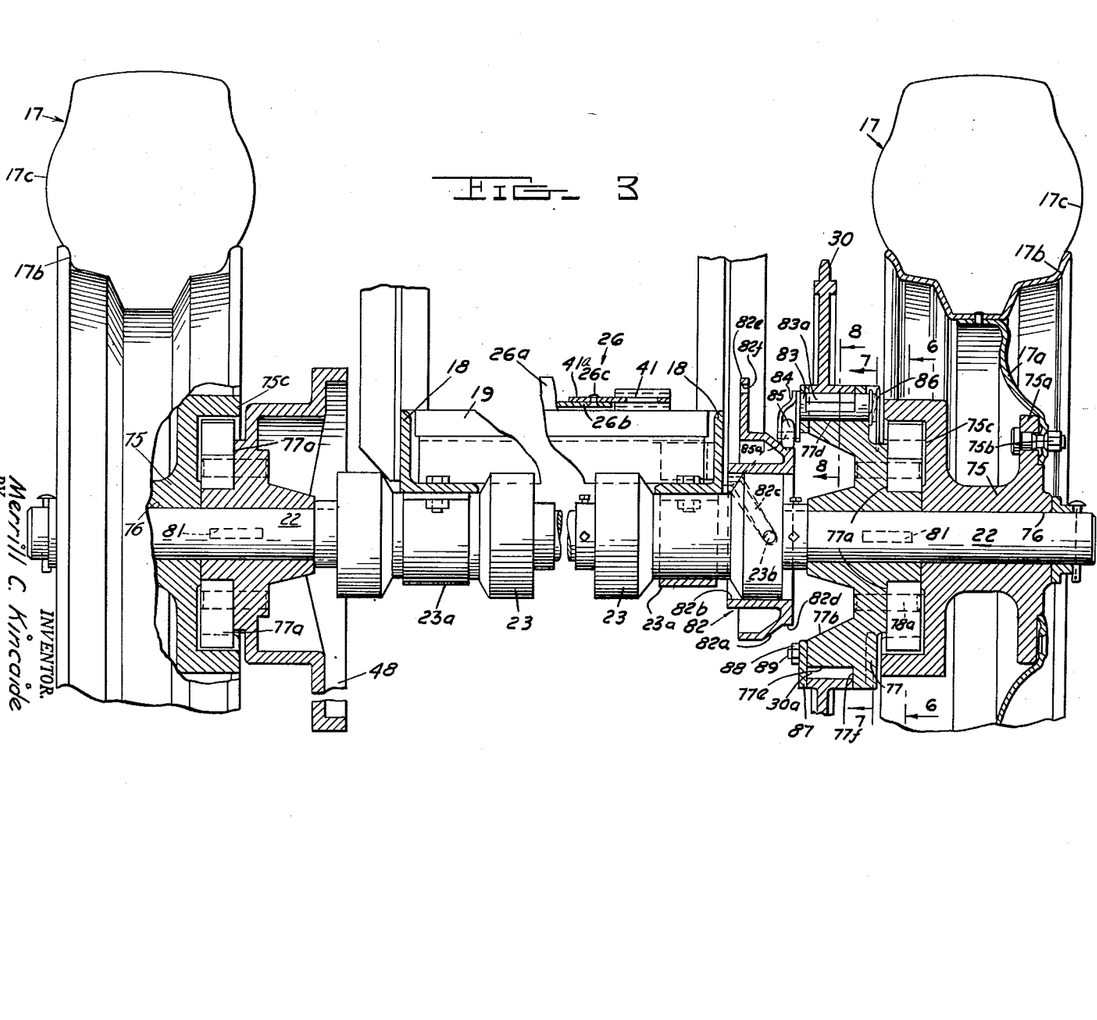

Simultaneously with the rotation of cams 54 and 58 by movement of lever 61, clutch 82 is rotated in a clockwise direction as shown in Figure 3 and pins 23b being in engagement with helical cam slots 82c will force such clutch to move longitudinally along shaft 22 towards the right as shown in Figure 3, thereby forcing roller 85 to ride upwardly on the conical surface 82a of such clutch. As roller 85 moves upwardly, fork 84 on which roller 85 is rotatably mounted will be pivoted in a clockwise direction as shown in Figure 8 to rotate the flat recess 83a away from the underside of sprocket 30 to bring the cylindrical portion of pin 83 into engagement with one of the plurality of semi-cylindrical grooves 30a whereby sprocket 30 is then locked or keyed to driving member 77. When in the extreme raised position of roller 85, such roller will then ride on the cylindrical portion of clutch 82 provided above and adjacent to the conical portion 82a of such clutch. Figure 10 best illustrates the position of clutch 82 and the locking pin 83 when in the engaged position. The conically shaped end of the clutch enters the corresponding groove 77b provided in the face of driving member 77. Driving member 77 being keyed to shaft 22 then drives sprocket 30 to effect movement of chain 27, whereby beaters 24 and 25 and widespread 31 are rotated to shred and distribute the manure carried in manure spreader 15.

The rate of feed of conveyor 26 may be selectively increased by merely advancing cam 54 to another position whereby pawl 46 will move ratchet 45 a greater angular distance per revolution of wheel 17. Lever 61 may be successively manipulated to so position cam 58 to arrest the movement of beaters 24 and 25 as well as widespread 31 by disengaging clutch 82 from driving member 77. When such rotary members have been stopped, conveyor 26 will continue in operation to permit cleaning out of any remaining particles on the floor of the manure spreader 15 and when such operation is completed, another pull on lever 61 will stop the movement of conveyor 26 by raising follower arm 47 sufficiently to lift roller 47a out of contact with cam 48. Thus all of the moving elements of the manure spreader are stopped. It should be mentioned here that starting or stopping of the beaters, conveyor belt and the widespread may be effected without the necessity of stopping the prime mover utilized to transport the manure spreader.

It is apparent from the foregoing description that there is here provided a manure spreader which is provided with a simple, rugged positive driving mechanism for powering the rotary beaters and the rotary wide-spread of the manure spreader. Such driving mechanism may be engaged to power such elements without the necessity of stopping the tractor drawing the manure spreader for changing gears or actuating other mechanisms to stop or start the beaters. Both the conveyor and the beaters are controlled by the actuation of but a single lever and by further successive actuations of such lever, a plurality of different rates of movement of the conveyor may be conveniently obtained. Such single control lever is conveniently operated from the tractor seat, and in any control condition, the control lever lies in the same unobtrusive position, never projecting adjacent to the tractor operator to interfere with his freedom of movement.

It will, of course, be understood that various details of construction may be varied through a wide range without departing from the principles of this invention and it is, therefore, not the purpose to limit the patent granted hereon otherwise than necessitated by the scope of the appended claims.

I claim:

1. In a material distributor having a rotatable material distributing element and a conveyor for feeding material to the distributing element, a rotating power source, a first power transfer means separably engageable between the material distributing element and said power source, a second power transfer means separably engageable between the material conveyor and said power source, a shaft rotatably mounted on the material distributor, a pair of cams on said shaft, a bell crank rotatably mounted on each end of said shaft, cam follower means connected to each of said bell cranks, linkage means connecting one of said bell cranks with the first power transfer means and said other crank with said second power transfer means, a reciprocable single control lever, and a rachet and pawl connection between said lever and said shaft for incrementally rotating said shaft upon reciprocation of said lever, thereby driving the material distributing elements and the material conveyor or the conveyor alone in accordance with the rotative positions of the cams as determined by rotation of said shaft.

2. In a material distributor having a rotatable material distributing element and a conveyor for feeding material to the distributing element, a rotating power source, a first controllable means for driving said material distributing element from said power source, a second controlable means for driving said conveyor from said power source, a rotatable shaft, a pair of cams movably mounted on said shaft for rotation therewith, linkage means connecting said cams respectively with said first and second controllable means to control the same upon cam rotation, and a single manually operable lever engageable with said shaft to rotate the same thereby concurrently rotating said cams to selectively simultaneously operate said distributing element and said conveyor or to operate said conveyor alone.

3. In a material distributor having a rotatable material distributing element and a conveyor for feeding material to the distributing element, a rotating power source, a first power transmitting means for connecting the material distributing element to said power source, a second power transmitting means for connecting the material conveyor to said power source, a shaft rotatably mounted on the material distributor, a pair of cams on said shaft, means including a cam follower engaging each of said cams, respectively, and a linkage connecting said cam followers to said first and second power transmitting means, respectively, to actuate said connecting means in accordance with the rotative position of the associated cam, said cams having peripherally overlapping actuating and dwell surfaces to selectively actuate and continue simultaneous operation of said distributing element and said conveyor or sole operation of said conveyor, respectively, the sole operation of said conveyor being effected by the greater dwell lengths of the cam associated with the conveyor.

4. The combination of claim 2, wherein said manually operable lever for rotating the shaft comprises a lever pivotally mounted on the forward end of the distributor for reciprocatory movement, resilient means urging the lever to a normal position closely adjacent the distributor forward end, a ratchet fixed to the shaft, and a pawl pivotally carried by the lever and engageable with the ratchet to effect incremental rotation of the shaft upon reciprocatory movement of the lever.

5. In a material distributor having a rotatable material distributing element and a conveyor for feeding material to the distributing element, a rotating power source, a first power transfer means separably engageable between the material distributing element and said power source, a second power transfer means separably engageable between the material conveyor and said power source, a pair of cams rotatably mounted on the material distributor, separate cam followers associated with said cams, a conveyor actuating linkage connecting one of said cam followers with said second power transfer means, a distributing element linkage connecting the other of said cam followers with said first power transfer means, said cams having peripherally corresponding actuating surface portions for simultaneously actuating said linkages upon cam rotation and dwell surface portions of different lengths to selectively retain said conveyor actuating linkage in operative positions upon continued cam rotation to thereby selectively render said distributor element linkage inoperative prior to inoperativeness of the conveyor actuating linkage.

6. In a material distributor having a rotatable material distributing element and a conveyor for feeding material to the element, a rotating power source, a clutch for selectively connecting the element to such power source, a power transfer device for selectively connecting said conveyor to said power source for intermittently feeding material to said element, a rotatable shaft located in spaced relation to said clutch and said power transfer device, a pair of rotary cams disposed on said shaft for concurrent rotation upon shaft rotation, a linkage connecting said first cam with said clutch for actuating said clutch and said distributing element in accordance with the rotated position of said first cam, a second linkage connecting said second cam with said power transfer device for actuating said power transfer device and the associated conveyor in accordance with the rotated position of said second cam, said cams having aligned corresponding peripheral surface portions for simultaneously actuating said linkages when said shaft is rotated to a first position, whereby said element and said conveyor are both driven from said power source, said cams also having corresponding dwell surfaces effective to retain said linkages in actuated position to continue operation of said element and said conveyor during further rotation of said shaft, and said cams having cutoff portions for interrupting actuation of said linkages, with the cutoff portion of said first cam being effective to interrupt actuation of said first linkage while said second cam retains said second linkage in operative position, and means for incrementally rotating said shaft to simultaneously rotate said cams, thereby controlling the actuation of said linkages and the driving of said element and said conveyor.

References Cited in the file of this patent

UNITED STATES PATENTS

| Number | Name | Date |
| --- | --- | --- |
| Re. 13,071 | Smith | Jan. 4, 1910 |
| 944,293 | Stebbins | Dec. 28, 1909 |
| 1,036,916 | Seaman | Aug. 27, 1912 |
| 1,868,337 | Storm | July 19, 1932 |
| 2,256,815 | Raney et al. | Sept. 23, 1941 |
| 2,342,837 | Brown | Feb. 29, 1944 |